Patented Feb. 23, 1932

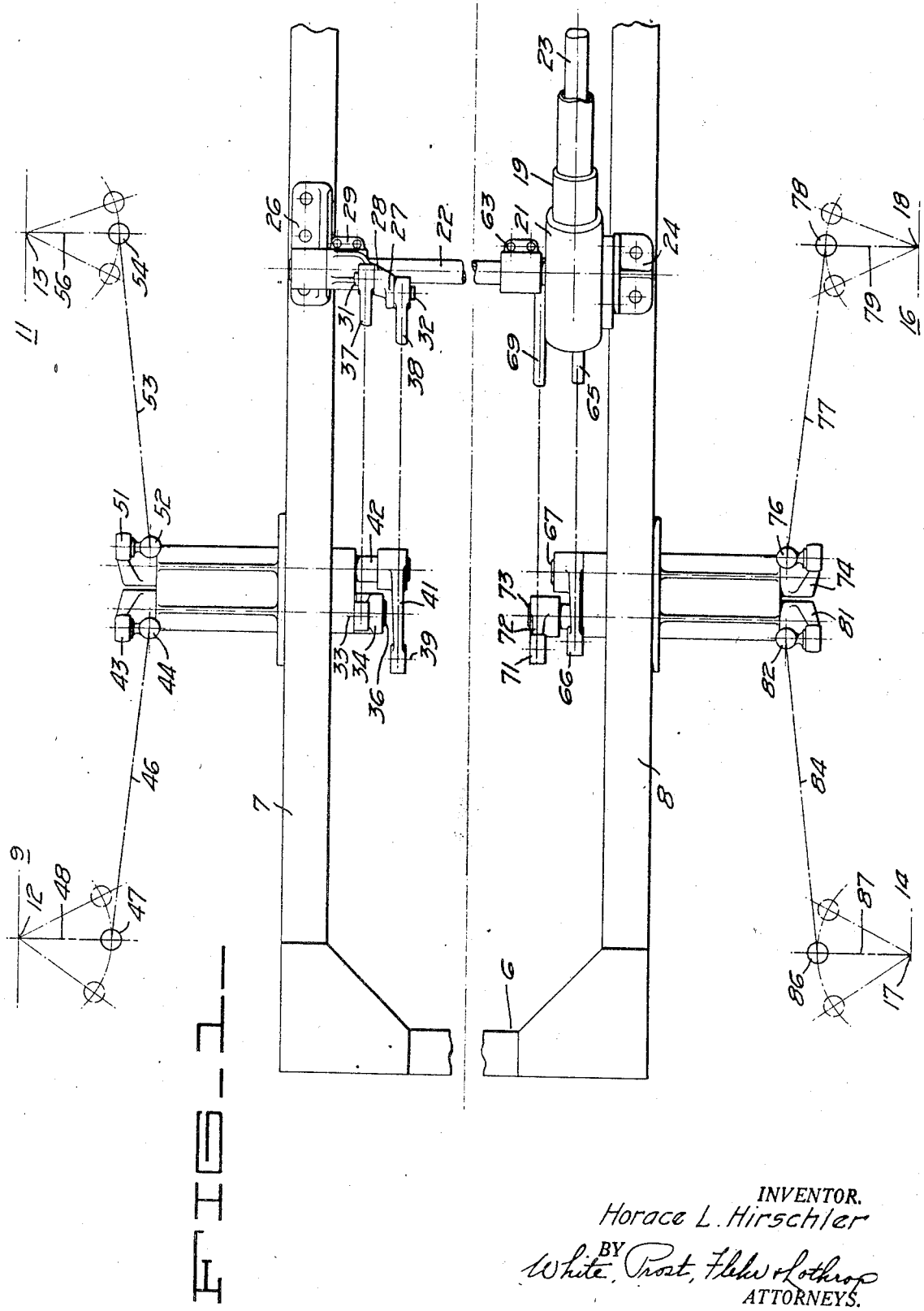

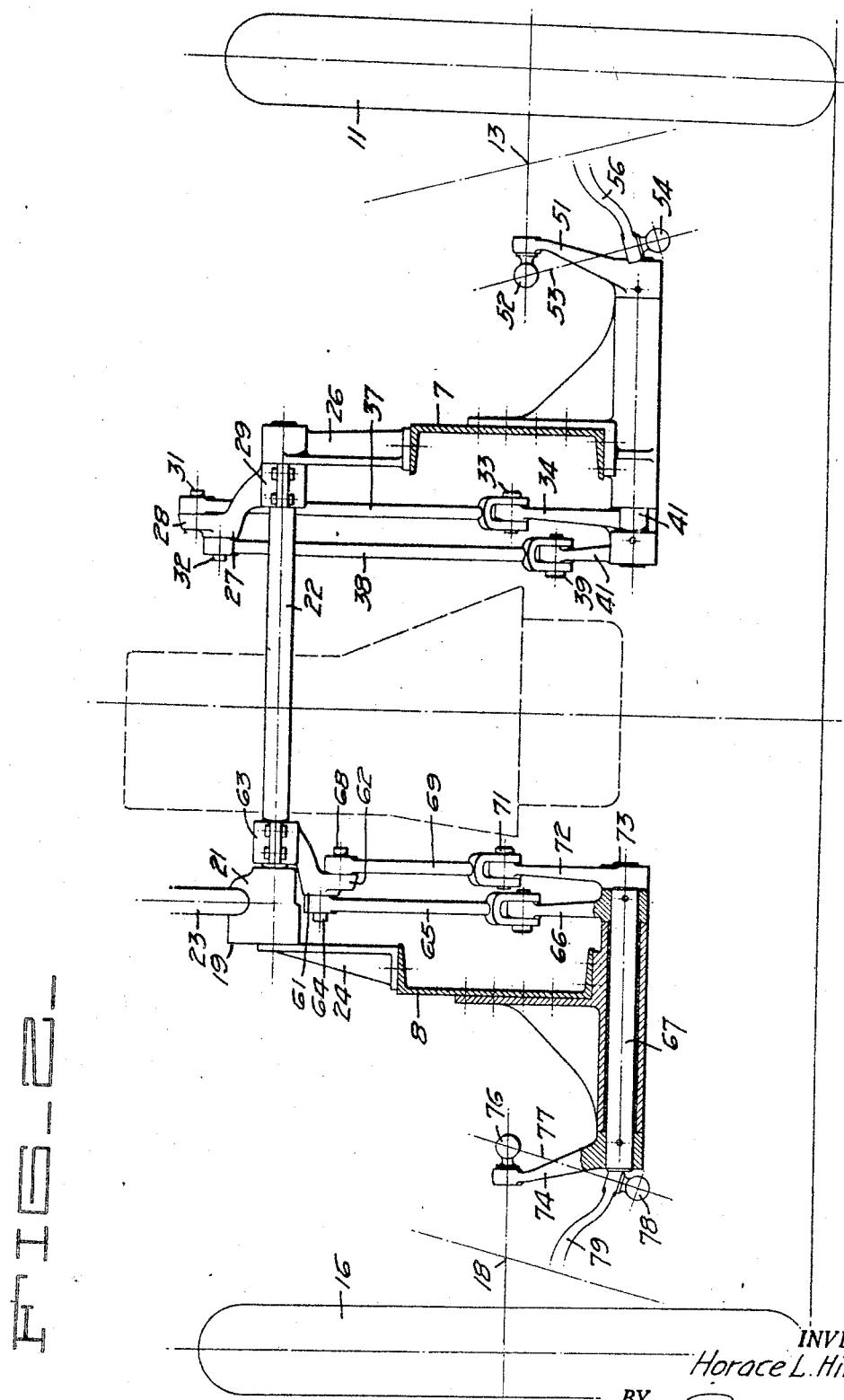

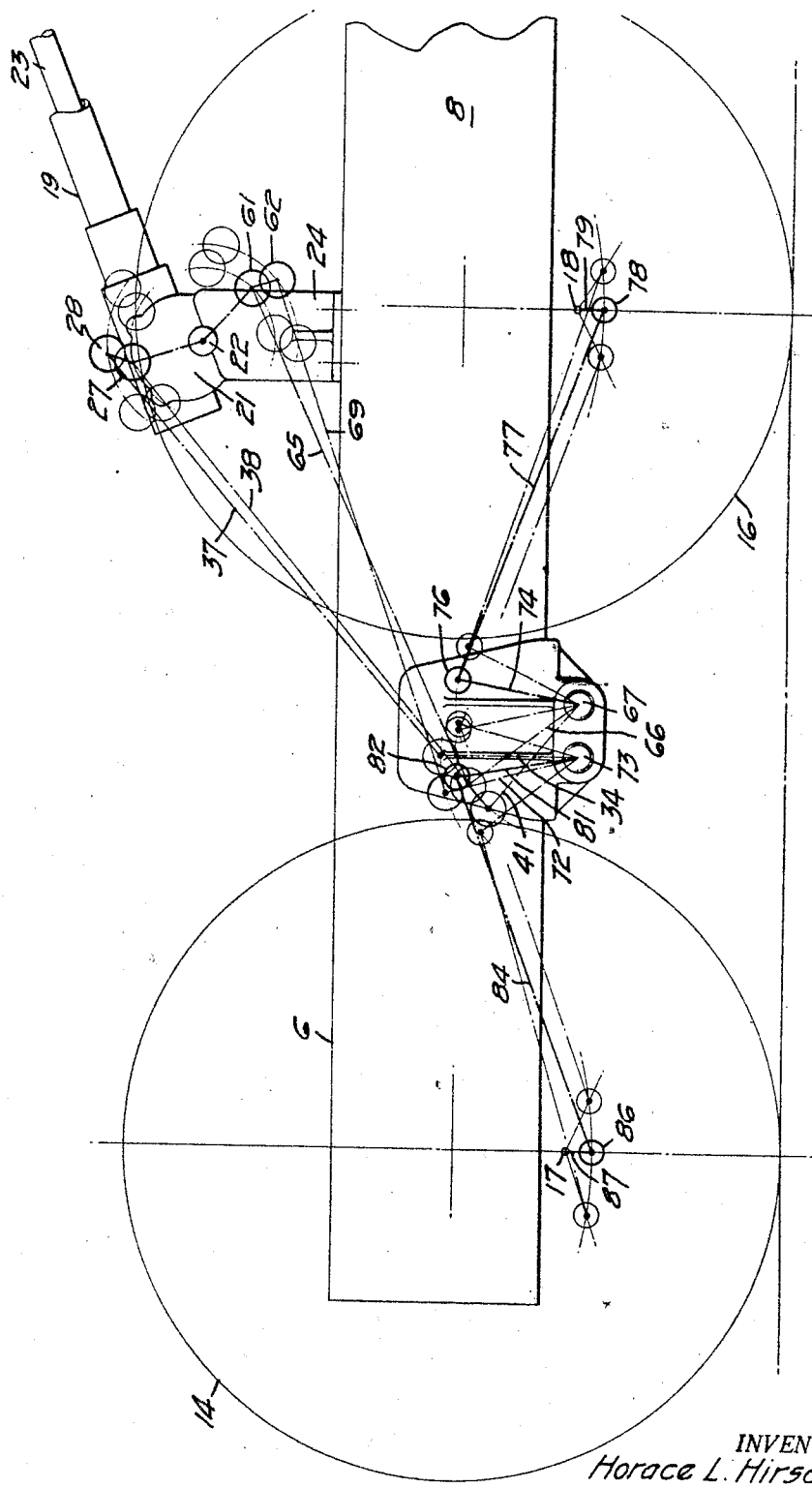

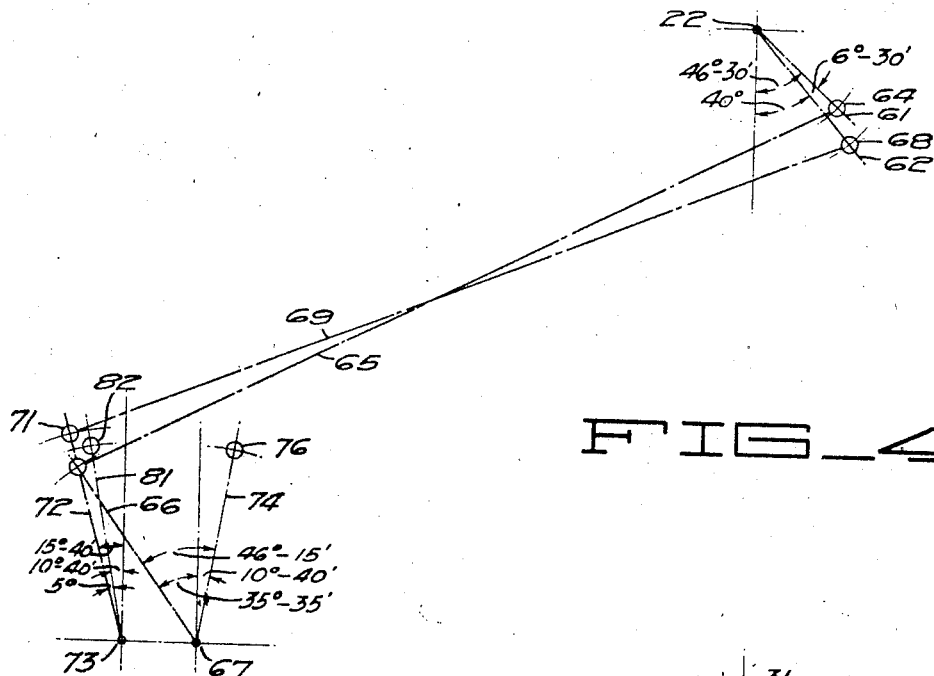
FIG_4_
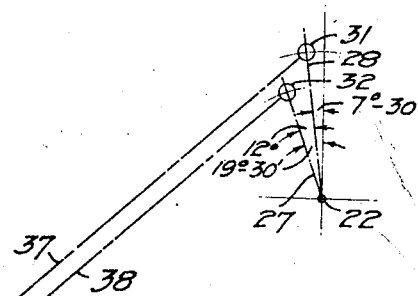
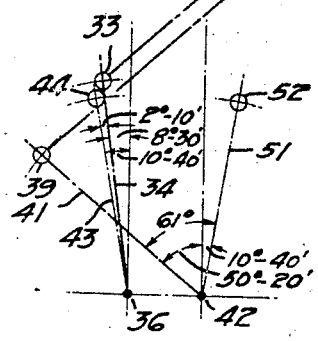
FIG_5_
INVENTOR.
Horace L. Hirschler
BY White, Prost, Fleke Lothrop
ATTORNEYS.

1,846,553

UNITED STATES PATENT OFFICE

HORACE L. HIRSCHLER, OF SAN FRANCISCO, CALIFORNIA, ASSIGNOR, BY MESNE ASSIGNMENTS, TO HAWKINS PATENTS, LTD., OF RENO, NEVADA, A CORPORATION OF NEVADA

STEERING LINKAGE

Application filed August 5, 1929. Serial No. 383,510.

My invention relates to mechanism for steering vehicles and is particularly concerned with the steering arrangement on a multi-wheeled vehicle of the type disclosed in Patent No. 1,721,732, issued July 23, 1929, to Charles A. Hawkins and in the copending application of Hawkins, Hirschler and Lothrop, Serial No. 382,972, filed August 2, 1929, and entitled "Vehicle". Such multi-wheel vehicles usually comprise six, eight or more ground engaging wheels most of which are subject to steering or dirigible movement. Difficulty has been experienced in providing a suitable steering linkage which will effect the proper dirigible movement of each of the wheels for all of the various different radii of turning of the vehicle. It is relatively a simple matter to calculate mathematically the various different angles for each of the wheels for the different turning radii of any given vehicle but it is a distinctly involved problem to design a steering linkage which will effect the desired movement. This result has heretofore been approached by the use of cams or cam surfaces in some form or other but these mechanical expedients are difficult to manufacture, maintain and operate and increase the cost of a vehicle more than is ordinarily desired.

It is therefore an object of my invention to provide a steering linkage which is effective to steer the vehicle properly for all different radii of turning.

Another object of my invention is to provide a simple linkage for effecting this result.

A further object of my invention is to provide a linkage, omitting the use of cams, for effecting the proper steering of a multi-wheeled vehicle.

An additional object of my invention is to use a number of duplicate parts in the linkage so that the cost thereof is kept at a low and reasonable figure.

A still further object of my invention is to facilitate the manufacture of the steering portion of a multi-wheeled vehicle.

The foregoing and other objects are attained in the embodiment of the invention shown in the drawings, in which Fig. 1 is a plan view, somewhat diagrammatic, showing the forward portion of a vehicle provided with the steering linkage of my invention.

Fig. 2 is an elevation looking in the direction of the arrow in Fig. 1.

Fig. 3 is a side elevation, somewhat diagrammatic, of the linkage of my invention as installed on the forward portion of a vehicle.

Fig. 4 is a motion study of the linkage of my invention associated with the left-hand wheels.

Fig. 5 is a motion study of the linkage of my invention associated with the right-hand wheels.

In its preferred form, the steering linkage of my invention comprises a frame on either side of which at least a pair of tandem dirigible wheels is located and which is provided with a cross shaft, actuated by a steering gear, and connected through intermediate stub shafts and suitable linkage to the individual dirigible wheels for pivoting them about their steering axes in the mathematically correct amount to effect the proper location of the wheels for all of the various radii of turning of the vehicle in both directions.

Although the steering linkage of my invention is capable of embodiment in numerous different environments and is capable of considerable variation within the scope of the invention, I have chosen to show it herein as it is applied to the type of vehicle shown in the above mentioned patent and in the above mentioned application. This vehicle includes eight wheels engaging the ground and pivotally attached to a frame for motion upwardly and downwardly in a vertical plane. Some of these wheels are also mounted to pivot about a steering axis which is approximately vertical or is slightly inclined to the vertical. For clarity in description I have herein disclosed only the forward portion of such a vehicle but it will be obvious to those skilled in the art that my linkage can as well be applied to other portions of a vehicle or can be extended to include more than four wheels.

The vehicle preferably includes a framework 6 comprising a pair of parallel longitudinal side rails 7 and 8. The side rail 7 is assumed to be on the right hand side of the vehicle while the side rail 8 is on the left hand side of the vehicle. Adjacent the side rail 7 is a pair of dirigible wheels 9 and 11 arranged in tandem and adapted to pivot about steering axes 12 and 13. These axes are slightly inclined to the vertical to improve the steering characteristics. On the left hand side of the vehicle adjacent the frame rail 8 is a second pair of wheels 14 and 16 likewise arranged in tandem and adapted to pivot for dirigible movement about steering axes 17 and 18 inclined in the same manner as the axes 12 and 13 but with reverse symmetry with respect thereto. The mounting of the wheels on the frame 6 forms no part of the present invention and it is understood that any suitable type of mounting can be utilized, preferably one such as is shown in the patent and application above mentioned.

In order to effect the proper steering of the various wheels enumerated I preferably provide a steering gear 19 suitably mounted on the framework 6 and preferably attached to the side rail 8. This steering gear can be of any conventional type and in the present instance includes a housing 21 containing gearing capable of imparting rotary motion to a cross shaft 22 upon corresponding rotary motion of a steering rod 23 under control of the vehicle operator.

The cross shaft 22 extends transversely of the vehicle and of the frame 6 and is suitably mounted in journals 24 and 26 fastened on the side rails 7 and 8. Arranged to be actuated by the cross shaft 22 are two similar sets of subsidiary linkages. The linkage for the right hand wheels 9 and 11 preferably includes a pair of levers 27 and 28. For convenience in construction these levers are usually incorporated in one unit, as shown in Figs. 1 and 2, which, at one end is suitably mounted on the cross shaft by a clamp 29. Projecting from the unit is a pin 31 located at a predetermined angular relationship with the axis of cross shaft 22 while projecting similarly is a pin 32 at a predetermined angular relationship to the pin 31 and to the axis of shaft 22.

In longitudinal alignment with pin 31 is a similar pin 33 at the radial extremity of a crank arm 34. This crank arm is affixed to a stub shaft 36 extending transversely of the frame 6 and disposed parallel to the cross shaft 22. The crank arm 34 is disposed in a predetermined angular relationship with the crank arm 28 and the two pins 31 and 33 are moved simultaneously by virtue of a link 37 which is journalled at opposite ends to the respective pins 31 and 33. Similarly, a link 38 connects the pin 32 with a pin 39 forming part of a crank arm 41 in turn fixed on a stub shaft 42 parallel to stub shaft 36. It will be noted by reference to the figures that the angular relationship of the crank arm 41 with respect to the lever 27 is different than the relationship of crank arm 34 with respect to its comparable lever 28. The net result of the linkage as thus far described is to impart different degrees of angular rotation to the stub shafts 36 and 42 for a predetermined angular rotation of the cross shaft 22.

At the outer extremity of stub shaft 36 I preferably provide a crank 43 which at one end carries a ball 44 connected to a link 46 in turn extending to a connection, as at 47, with a steering arm 48 associated with wheel 9. Thus angular rotation of crank 43 in a substantially vertical plane effects a consequent angular rotation of the steering arm 48 in a substantially horizontal plane. In a similar manner, stub shaft 42 is provided at its outer extremity with a crank 51 carrying at one end a ball 52 connected by a suitable link 53 with the extremity 54 of a steering arm 56 associated with wheel 11. The angular relationship of the various cranks and steering arms is such that the varying angular rotation of stub shafts 36 and 42 effects the desired pivotal movement of wheels 9 and 11 about their dirigible axes 12 and 13 in the proper amount for correct location of the wheels for all radii of turning.

In a somewhat comparable manner I provide a subsidiary linkage for operating the wheels 14 and 16 for steering movement. At the left hand side of the frame adjacent side rail 8 levers 61 and 62 are preferaably affixed to the cross shaft 22 by a clamp 63. It may be noted that for economy in manufacture levers 61 and 62 are identical with levers 27 and 28 but project from the cross shaft 22 in substantially the opposite direction and are disposed with reverse symmetry. Lever 61 is provided with a pin 64 connected to a link 65 which, at its opposite end, is fastened to a crank arm 66 on a stub shaft 67. Similarly lever 62 is provided with a pin 68 engaging a link 69 extending forwardly to a connection, as at 71, with a crank arm 72 on a stub shaft 73. Stub shafts 67 and 73 are preferably in axial alignment with stub shafts 36 and 42 and likewise extend transversely of the frame and parallel to cross shaft 22. It will be observed, however, that crank arms 66 and 72 bear different angular relationships to their respective axes than do the crank arms 34 and 41.

At the outer extremity of stub shaft 67 I affix a crank 74 at its radial extremity provided with a ball 76 engaging a link 77 also connected, as at 78, to a steering arm 79 associated with wheel 16. In a comparable manner stub shaft 73 is at its outer end provided with a crank 81 carrying a ball 82 for connecting with a link 84. This link at its forward end connects, as at 86, with a steering arm 87 associated with wheel 14. The angular relationship existing between cranks 81 and 74 and steering arms 87 and 79 is such that the proper degree of pivotal movement is given to wheels 14 and 16 to locate the wheels in the proper positions for all radii of turning of the vehicle.

It will be appreciated that upon a given angular movement of the steering rod 23 which effects an exactly corresponding angular movement of cross shaft 22, all of the wheels in the unit described are given their proper locations for steering at all of the various radii of turning both to the right and to the left by virtue of the varying angular relationships and varying directions of the several cranks and crank arms and levers. It will be further appreciated that in accordance with my invention the linkage is composed of a number of substantially identical parts which reduce the cost of manufacture and that no cams are necessary although the results achieved are mathematically exact.

It is to be understood that I do not limit myself to the form of steering linkage shown and described herein, as the invention, as set forth in the following claims may be embodied in a plurality of forms.

I claim:

1. A steering linkage comprising a frame, a pair of tandem dirigible wheels mounted on said frame, a steering arm for each of said wheels, a pair of stub shafts arranged transversely on said frame, a crank on each of said stub shafts, a link connecting each of said steering arms to said cranks, a cross shaft on said frame, a steering gear for rotating said cross shaft, a pair of levers on said cross shaft, a crank arm on each of said stub shafts, and a link connecting each of said levers to said crank arms.

2. A steering linkage comprising a frame, a pair of tandem dirigible wheels mounted on said frame, a parallel pair of tandem dirigible wheels mounted on said frame, a steering arm for each of said wheels, a pair of stub shafts arranged transversely at one side of said frame, a second pair of stub shafts arranged transversely at the other side of said frame, a crank on each of said stub shafts, a link connecting each of said steering arms to said cranks, a cross shaft on said frame, a steering gear for rotating said cross shaft, a pair of levers at one end of said cross shaft, a crank arm on each of said first-named stub shafts, a link connecting each of said levers to said crank arms, a pair of levers at the other end of said cross shaft, a crank arm on each of said second-named stub shafts, and a link connecting each of said second-named levers to said second-named crank arms.

In testimony whereof, I have hereunto set my hand.

HORACE L. HIRSCHLER.